(12) United States Patent
Ozaki

(10) Patent No.: US 7,085,407 B2
(45) Date of Patent: Aug. 1, 2006

(54) DETECTION OF RIBCAGE BOUNDARY FROM DIGITAL CHEST IMAGE

(75) Inventor: Osamu Ozaki, Amagasaki (JP)

(73) Assignee: Mitsubishi Space Software Co., Ltd., Tokyo (JP)

(*) Notice: Subject to any disclaimer, the term of this patent is extended or adjusted under 35 U.S.C. 154(b) by 675 days.

(21) Appl. No.: 09/983,604

(22) Filed: Oct. 25, 2001

(65) Prior Publication Data

US 2002/0106118 A1 Aug. 8, 2002

(30) Foreign Application Priority Data

Dec. 12, 2000 (JP) ............................. 2000-377495

(51) Int. Cl.
*G06K 9/00* (2006.01)

(52) U.S. Cl. .................. 382/132; 382/168; 128/922

(58) Field of Classification Search ................ 382/132, 382/128, 131, 162, 165, 168, 170, 181, 254, 382/266, 275, 282
See application file for complete search history.

(56) References Cited

U.S. PATENT DOCUMENTS

| | | | | |
|---|---|---|---|---|
| 4,851,984 A | * | 7/1989 | Doi et al. | ............ 382/108 |
| 5,359,513 A | * | 10/1994 | Kano et al. | ............ 382/128 |
| 5,790,690 A | * | 8/1998 | Doi et al. | ............ 382/128 |
| 6,775,399 B1 | * | 8/2004 | Jiang | ............ 382/128 |

FOREIGN PATENT DOCUMENTS

| | | |
|---|---|---|
| JP | 58-186874 | 10/1983 |
| JP | 7-37074 | 2/1995 |
| JP | 09-153141 | 6/1997 |

* cited by examiner

*Primary Examiner*—Brian Werner
*Assistant Examiner*—Christopher Lavin
(74) *Attorney, Agent, or Firm*—Wenderoth, Lind & Ponack, L.L.P.

(57) ABSTRACT

To provide more accurate ribcage boundary information and landmark information, the size of a searching ROI which is mapped on a digital chest image is decided, the ROI is set on the image, an image existing within the region that is set on the image is enhanced, a profile of pixel values existing within the region is obtained, and the obtained profile is analyzed so that candidate points for a ribcage boundary are obtained. The deciding, setting, enhancing, obtaining, and analyzing operations are repeated until a center of each searching ROI advances immediately before a given search limit. As a result, a series of candidate points for the ribcage boundary is provided.

14 Claims, 12 Drawing Sheets

PRIOR ART

PRIOR ART

PRIOR ART

FIG.13

PRIOR ART

FIG.14A

PRIOR ART

FIG.14B

DETECTION OF RIBCAGE BOUNDARY FROM DIGITAL CHEST IMAGE

BACKGROUND OF THE INVENTION

1. Field of the Invention

The present invention relates to an image processing technique for automatically and accurately detecting an anatomical configuration from a (PA: postero-anterior) digitized chest radiograph, which is necessary for the computer-aided diagnosis of the chest, and in particular, to an image processing technique that makes it possible to, with higher precision, detect the boundary of a ribcage from a digitized chest radiograph.

2. Description of the Related Art

Digitized chest radiographs have been widely used in the field of computer-aided diagnosis. A wide variety of types of computer-aided diagnosis which is capable of automatically detecting ribcage boundary information and landmark information both specifying anatomical configurations of the chest have been known. One conventional technique is provided by "Xin-Wei Xu and Kunio Doi, Image feature analysis for computer-aided diagnosis: Accurate determination of ribcage boundary in chest radiographs, Med. Phys. 22(5), May 1995." This technique is also provided by Japanese Patent Laid-open Publication NO.7-37074.

This diagnostic technique uses lesion-enhanced images in order to detect the temporal changes of diseases such as lung diseases from digitized chest radiographs which are acquired at different times for the same patient's region. To increase diagnostic accuracy, this technique comprises the steps of obtaining previous and current digital chest images, positioning both the previous and current digital images by performing a non-linear warping processing based on a non-linear warping technique on either the previous or current digital image, and making a subtraction between the previous and current image, one of which having undergone the non-linear warping. The non-linear warping technique uses information that is detected from a chest image in relation to its anatomical structure and is based on a local matching technique to be applied to a number of tiny regions of interest (ROIs) which are selected based on the detected information. The non-linear warping technique is a mapping of amounts of matching shift obtained between corresponding locations in two frames of images. The mapping is realized by using amounts of local matching resulting from a local matching technique which is applied to the locations and a weighted fitting technique which uses weights resulting from image data analysis that is applied to the ROIs. In addition, the mapping of shift amounts is based on two-dimensional polynomial functions which are fitted to shift values.

However, the above-described conventional automatic detection technique tends to fail in the detection of boundary candidate points if contrast is low in the vicinity of a ribcage boundary. If such a failure occurs, the ribcage boundary, which is acquired by approximating the boundary candidate points to polynomials, deviates from the true ribcage boundary. This reduces the accuracy in computer-aided diagnosis as a whole.

In addition, when a searching ROI is designated with a diaphragm which is included in the region, the boundary candidate points are pulled toward structures within the lung views. The boundary candidate points are difficult to be detected on the true ribcage boundary. This results in a lowered accuracy in computer-aided diagnosis as well.

Further, in cases where a top lung is depicted in high contrast on a chest image, the detected boundary candidate points are pulled toward the ribs, clavicles, lesions, and/or others residing within the lung views. In this case, the upper ribcage boundary candidate points will not be detected on the true upper ribcage boundary, thereby leading to a lowered accuracy in computer-aided diagnosis.

Still further, if a searching ROI to search an upper ribcage boundary is designated so as not to cross the true ribcage boundary, then the boundaries of chest structures (the ribs, clavicles, lesions, scapulas, and/or others) other than the original true boundary are detected. This also deteriorates computer-aided diagnosis in accuracy.

For using features of a chest image and positional information which are indicative of an anatomical structure in computer-aided diagnosis, it is significant to acquire more accurate information about a ribcage boundary and landmarks. It has therefore been strongly desired that more accurate information be available for computer-aided diagnosis.

SUMMARY OF THE INVENTION

An object of the present invention is to acquire both ribcage boundary information and landmark information with a higher precision, which has not been obtained so far, so that a computer-aided diagnosis is able to gain an increased accuracy of diagnosis.

In order to realize the above-described object, one aspect of the present invention is directed to a method for detecting, from a digital chest image, a ribcage boundary for computer-aided diagnosis with which anatomical structure information is detected from the digital chest image. The method includes repetitions each comprising the steps of: deciding a size of a searching ROI mapped on the digital chest image, where the searching ROI is different in position repetition by repetition; setting the searching ROI on the digital chest image; enhancing an image within the searching ROI that is set on the digital chest image; obtaining a profile of pixel values existing within the searching ROI; and analyzing the obtained profile so as to decide a candidate point for the ribcage boundary, wherein the deciding, setting, enhancing, obtaining, and analyzing steps are repeated until a center of each searching ROI advances immediately before a given search limit. As a result, a series of candidate points for the ribcage boundary are provided. Further, using this method makes it possible to, with higher precision, detect correct ribcage boundaries from chest images which are difficult to be detected by the conventional technique.

Preferably, a step of lowering noise of the image residing in the searching ROI intervenes between the enhancing and obtaining steps. Thus, a correct ribcage boundary can be detected at a greater percentage even in the vicinity of the ribcage boundary which is low in contrast.

Still preferably, a step of weighting the profile of pixel values intervenes between the obtaining and analyzing steps, wherein the profile consists of a horizontal pixel-value averaged vertical profile and a vertical pixel-value averaged horizontal profile, and a weight of the weighting becomes increasingly smaller as the weighting advances from a center of each of the vertical and horizontal profiles toward the insides of the lung views. Hence, obstacles, such as the rib, clavicle, scapula, diaphragm, and/or lesions, to the detection of a ribcage boundary can be removed, and a correct ribcage boundary can be detected at a greater percentage.

It is preferred that the size of each of the plurality of searching ROIs which are mapped on the digital chest image through the repetitions are fixed and independent on the locations of the searching ROIs. This makes it possible to set a searching ROI at locations which were difficult for the conventional technique to set the ROI. Therefore, points of ribcage boundary candidates are easier to search. Even if failed in detection at some points, a ribcage boundary can be fitted to its almost true shape, as long as one or more points are acquired on its true boundary.

Another aspect of the present invention is directed to a system for detecting, from a digital chest image, a ribcage boundary for computer-aided diagnosis with which anatomical structure information is detected from the digital chest image. The system comprises: a landmark detector for detecting landmark information serving as a landmark in displaying a chest configuration which is depicted on the digital chest image; a candidate point series detector for detecting both of an upper ribcage boundary point series and right/left ribcage boundary candidate point series from image data of the digital chest image and the land mark information; a boundary point series combining unit for combining the upper ribcage boundary point series with the right/left ribcage boundary candidate point series so as to produce ribcage boundary information which is indicative of a contour of ribs of the chest; and an image displaying processor for displaying ribcage information which is made up of the landmark information and the ribcage boundary information on the image. Therefore, the contrast of an image which is enclosed by a searching ROI can be enhanced in the detection of the upper ribcage boundary candidate point series and the right/left ribcage boundary candidate point series. This causes the ribcage boundary to be noticeable, thereby providing ribcage boundary information with precision. A rate of success in detection of the ribcage boundary is thus improved.

Preferably, the system further comprises an element for weighting a pixel-value profile of an image residing within a searching ROI to be mapped on the digital chest image. Hence, influences of the rib, clavicle, scapula, diaphragm, and/or lesions can be avoided, so that more accurate ribcage boundary information is provided. A rate of success in the detection of the ribcage boundary increases noticeably.

It is also preferred that the system further comprises an element for smoothing the image residing within the searching ROI by using a moving average filter composed of a region in an area that is smaller than the searching ROI. Accordingly, without being influenced by even a slight amount of noise, more accurate ribcage boundary information is provided, and therefore, a rate of success in the detection of the ribcage boundary increases remarkably.

It is also preferred that the searching ROI is set to have a length which is larger than the widths of the ribs and clavicles in the digital chest image, and that system further comprises means for searching the points by using the searching ROI whose size is fixed from a search starting point to a search end point. This makes it possible to set a searching ROI at locations which were difficult for the conventional technique to set the ROI. Hence, points of ribcage boundary candidates are easier to search. Even if failed in detection at some points, a ribcage boundary can be fitted to its almost true shape, as long as one or more points are acquired on its true boundary.

DETAILED DESCRIPTION OF THE PREFERRED EMBODIMENTS OF THE INVENTION

Preferred embodiments of the present invention will now be described with reference to the accompanying drawings.

At first, referring to FIGS. 1 to 4, the configuration of a ribcage boundary detecting system according to an embodiment, which is used for detecting the boundary of a ribcage from a digital chest image, will now be described.

Figure 1:
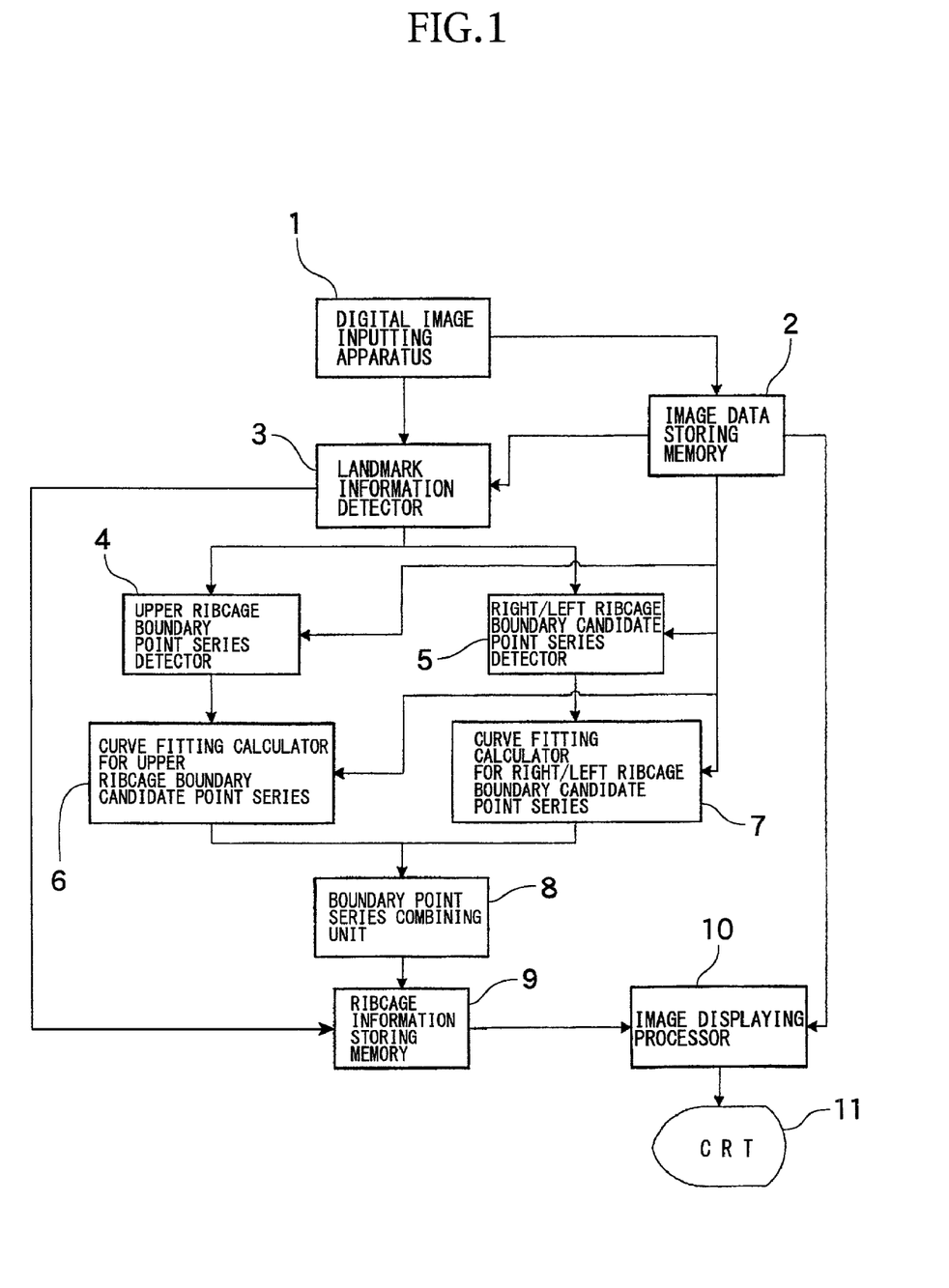
FIG. 1 is a block diagram showing the entire configuration of a ribcage boundary detecting system for digital chest images according to an embodiment of the present invention.
Figure 2:
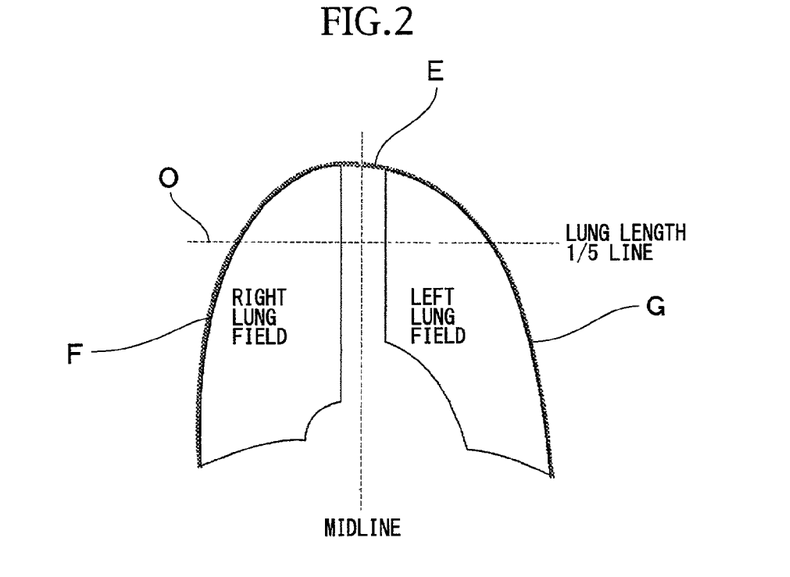
FIG. 2 is an illustration of ribcage information which is treated as the anatomical structure information of a chest image.
Figure 3:
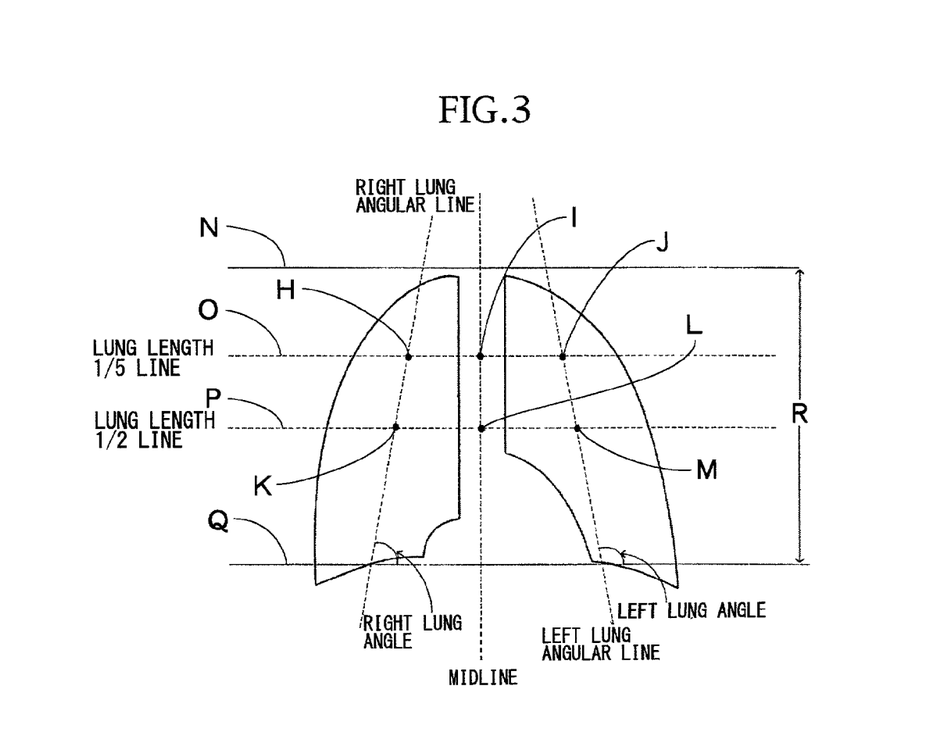
FIG. 3 is an illustration of landmark information composing part of the ribcage information.
Figure 4:
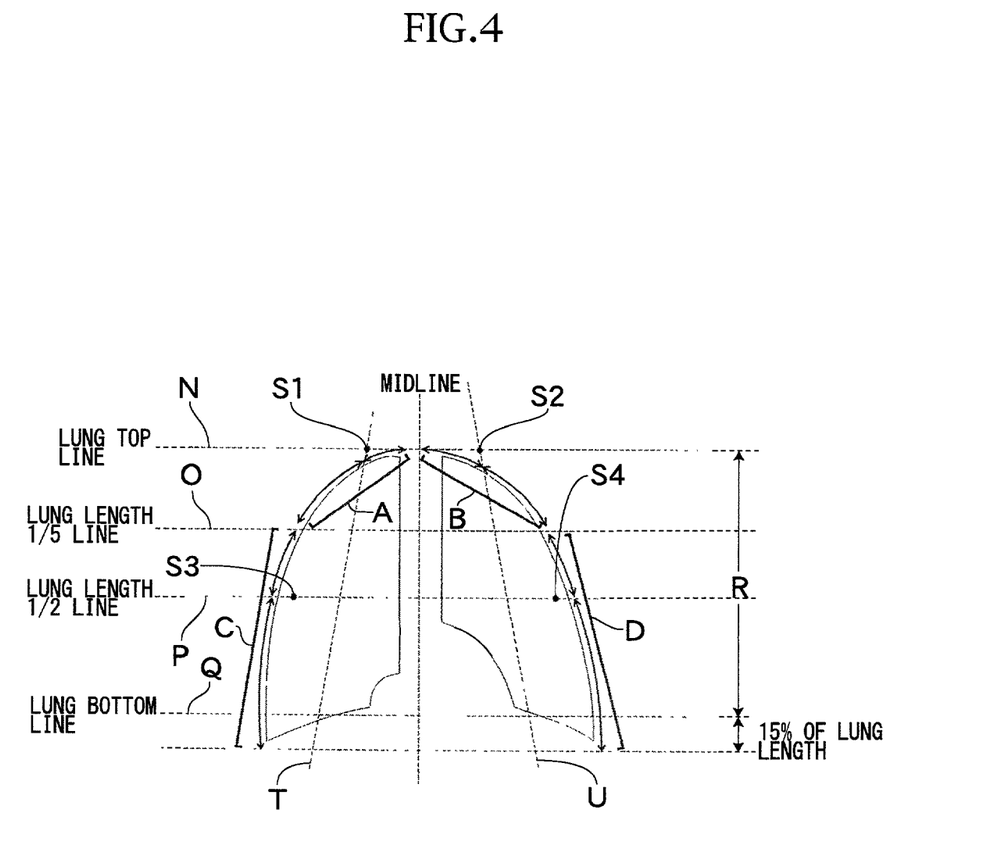
FIG. 4 illustrates a series of boundary candidate points which are adopted as ribcage boundary information composing part of the ribcage information.

FIG. 1 shows the entire configuration of the ribcage boundary detecting system according to the present embodiment. FIG. 2 illustrates pieces of ribcage information which are adopted as the anatomical structure information of a chest image. FIG. 3 illustrates pieces of landmark information which composes part of the pieces of the ribcage information. FIG. 4 illustrates lines of boundary candidate points serving as pieces of ribcage boundary information which composes part of the pieces of the ribcage information.

As shown in these drawings, the ribcage information of a chest image consists of pieces of ribcage boundary information depicting contour lines connecting outer ends of the chest ribs, and pieces of landmark information which ae taken as landmarks for displaying a chest configuration.

As shown in FIG. 2, the ribcage boundary information is made up of an upper ribcage boundary E that connects a series of upper ribcage boundary points which are positioned higher than a lung length ⅕ line, a right ribcage boundary F that connects a series of right ribcage points which are positioned lower than the lung length ⅕ line, and a left ribcage boundary G that connects a series of left ribcage points which are positioned lower than the lung length ⅕ line.

As shown in FIG. 3, the landmark information includes coordinates showing positions, such as a center H of the right lung on the lung length ⅕ line, an X-coordinate I of a midline on the lung length ⅕ line, a center J of the left lung on the lung length ⅕ line, a center K of the right lung on the lung length ½ line, an X-coordinate L of a midline on the lung length ½ line, and a center M of the left lung on the lung length ½ line; Y-coordinates, such as a top end line N of the lung, lung length ⅕ line O, lung length ½ line P, lung bottom line Q of the lung; and lengths such as a lung length R.

As shown in FIG. 4, the series of the boundary candidate points, which serve as the ribcage boundary information, include a series A of upper right ribcage boundary candidate points, a series B of upper left ribcage boundary candidate points, a series C of right ribcage boundary candidate points, a series D of left ribcage boundary candidate points, a series A+B of upper ribcage boundary candidate points, and a series C+D of left/right ribcage boundary candidate points.

In the image processing system of FIG. 1, there is provided a digital image inputting apparatus 1 which is capable of digitizing chest radiographs that were imaged. For digitizing a chest radiograph into a chest image (PA chest image), the digital image inputting apparatus 1 serves as an apparatus such as a film digitizer for digitizing a film. For digitally imaging a chest radiograph, the digital image inputting apparatus 1 operates as a digital imaging system such as a CR (computed radiography) system. Either system can be used, provided that it is able to digitize chest films.

An image data storing memory 2 is provided to memorize chest images which are digitized by the digital image inputting apparatus 1.

A landmark information detector 3, which receives chest frontal image data from the digital image inputting apparatus 1, detects landmark information from the received chest frontal image data pertaining to the landmark composing part of the ribcage information.

An upper ribcage boundary point series detector 4, which is connected with both landmark information detector 3 and the image data storing memory 2, detects an upper ribcage boundary point series A+B from the chest frontal image data and the landmark information.

A right/left ribcage boundary candidate point series detector 5, which is connected with the upper ribcage boundary point series detector 4, the landmark information detector 3 and the image data storing memory 2, detects a right/left ribcage boundary candidate point series from the chest frontal image data, information about the upper ribcage boundary candidate point series and the landmark information.

A curve fitting calculator 6 for the upper ribcage boundary candidate point series, which is connected with both the upper ribcage boundary point series detector 4 and the image data storing memory 2, performs a curve fitting calculation on the upper ribcage boundary point series which is obtained by the upper ribcage boundary point series detector 4 so as to provide a series of continuously connected points with respect to X-coordinates.

A curve fitting calculator 7 for the rigtht/left ribcage boundary candidate point series, which is connected with both the right/left ribcage boundary candidate point series detector 5 and the image data storing memory 2, performs a curve fitting calculation on the right lung/left lung ribcage boundary point series which is obtained by the right/left ribcage boundary candidate point series detector 5 so as to provide lines of continuously connected points with respect to Y-coordinates.

A boundary point series combining unit 8, which is connected with both the curve fitting calculators 6 and 7, combines the upper ribcage boundary point series and the right lung/left lung ribcage boundary point series based on the landmark information so as to obtain a ribcage boundary point series for each of the right and left ribcages.

A ribcage information storing memory 9, which is provided to be connected with both the landmark information detector 3 and the boundary point series combining unit 8, memorizes the ribcage boundary information which is obtained by the combining unit 8 and the landmark information which is detected by the landmark information detector 3.

An image displaying processor 10, which is coupled with the ribcage information storing memory 9 and the image data storing memory 2, performs processing for displaying the ribcage boundary information, chest image data, and others. The image data processed by the image displaying processor 10 are then sent to a CRT (cathode ray tube) to visualize an image which can be observed by users.

Other display devices, such as a plasma display or a liquid crystal display, can be used instead of the CRT 11. However, it is preferable to use the CRT when taking a graduation display performance into account. Moreover, it is preferred that a CRT be used whose scanning line is more than 1000 in number, which is known as a highly fine CRT for medial diagnosis.

Referring to FIGS. 5 to 9, a method for detecting a ribcage boundary of a digital chest image in the present embodiment will now be described. This method is carried out by using the ribcage boundary detecting system described above.

In this detection of a ribcage boundary, search starting points to decide ribcage boundaries of right/left lung fields are set to S1, S2, S3, and S4, as shown in FIG. 4. The point S1, which is an intersection made between the top end line N of a lung and a right lung angular line T, is handled as a search starting point for the upper right ribcage boundary candidate points. The point S2, which is an intersection made between the top end line N and a left lung angular line U, is handled as a search starting point for the upper left ribcage boundary candidate points. The point S3, which is located near a right ribcage boundary of the right lung on the lung length ½ line, is handled as a search starting point for the right ribcage boundary candidate points. The point S4, which is located near a left ribcage boundary of the left lung on the lung length ½ line, is handled as a search starting point for the left ribcage boundary candidate points.

Figure 5:
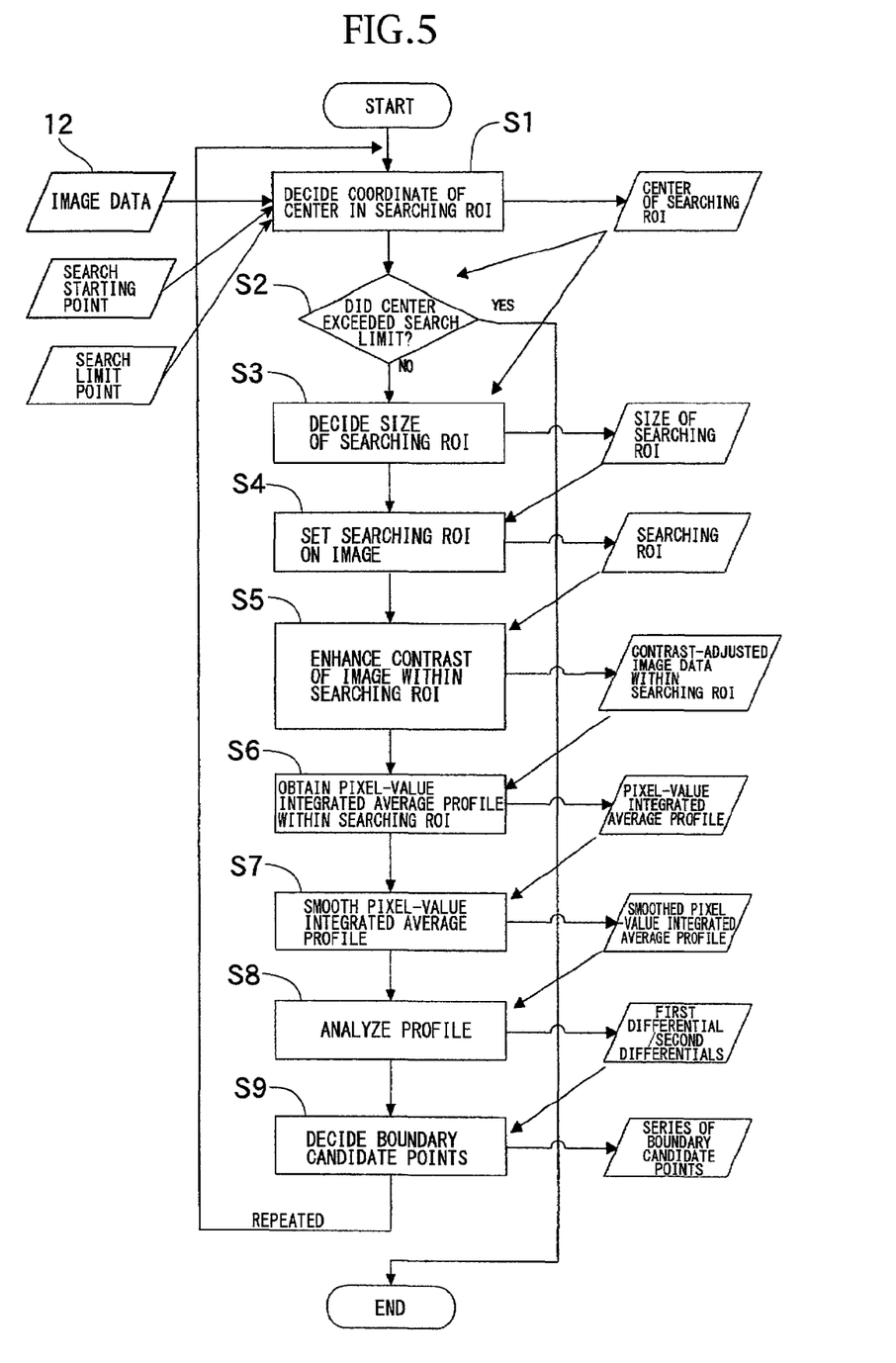
FIG. 5 shows a flowchart relating to the decision of the upper ribcage boundary candidate point series and the decision of a right/left ribcage candidate point series, which is part of a method of detecting a ribcage boundary from a digital chest image, which method is carried out by a ribcage boundary detecting system according to the embodiment of the present invention.

FIG. 5 shows a flowchart for deciding a series of upper ribcage boundary candidate points and a series of right/left ribcage boundary candidate points from a chest image. The flowchart of FIG. 5 expresses the method for detecting a ribcage boundary, which is used by the ribcage boundary detecting system according to the present invention.

For deciding a center of each searching ROI by using digitized image data 12 (Step S1), the center will be first calculated based on a search starting point and a candidate point acquiring distance. In the second or later time of acquisition, which is repeated, the center of the searching ROI for the next candidate point is calculated based on the center of the last-acquired searching ROI and the candidate point acquiring distance. When the center of a certain searching ROI exceeds a search limit point after deciding its center several times, the search will be terminated (Step S2).

In the present detection, the candidate point acquiring distance is set, as references, to a value of 1% of the entire image width for searching the upper ribcage boundary candidate point series and to a value of 3% of the entire image length for the right/left ribcage boundary candidate point series. The smaller the candidate point acquiring distance, the more time for processing it takes, but candidate points can be obtained at fine intervals. In contrast, the larger the candidate point acquiring distance, the less time for processing it takes, but obtained candidate points are rough in intervals. Therefore, it is preferred that the distance be determined with reference to the foregoing percentages, 1% and 3%, depending on the type of diagnosis.

Then, a size of the searching ROI at the search starting point for the upper ribcage boundary candidate point series and a size of the searching ROI at the search starting point for the right/left ribcage boundary candidate point series are decided (Step S3). The former size (width×length) is "M×N (M<N)" at the search starting point and "M×L (L<N)" at positions other than the search starting point, while the latter size is "U×V (U>V)" at the search starting point and "W×V (W<U)" at positions other than the search starting point. As a target of the size of the searching ROI, it is preferable that its height is larger than the widths of the ribs and clavicles. In the present detection, as examples for size references, M is set to a value of about 2% of the entire image width, N is set to a value of about 8% of the entire image length, L is set to a value of about 6% of the entire image length, U is set to a value of about 8% of the entire image width, V is set to a value of about 3% of the entire image length, and W is set to a value of about 6% of the entire image width. Alternatively, sizes which are formed by adding or reducing a distance of several pieces of pixels to or from each of the above sizes are still available.

Then, the center of the searching ROI and a pixel value of a rectangular area shown in the size of the searching ROI, which were obtained at Steps S1 to S3, are acquired on the image (Step S4).

Based on the image data acquired at Step S4, a contrast enhancing processing is performed on image data enclosed by the searching ROI, thereby enabling an easy finding of boundary candidate points at the next process of Step S6 (Step S5).

Figure 6:
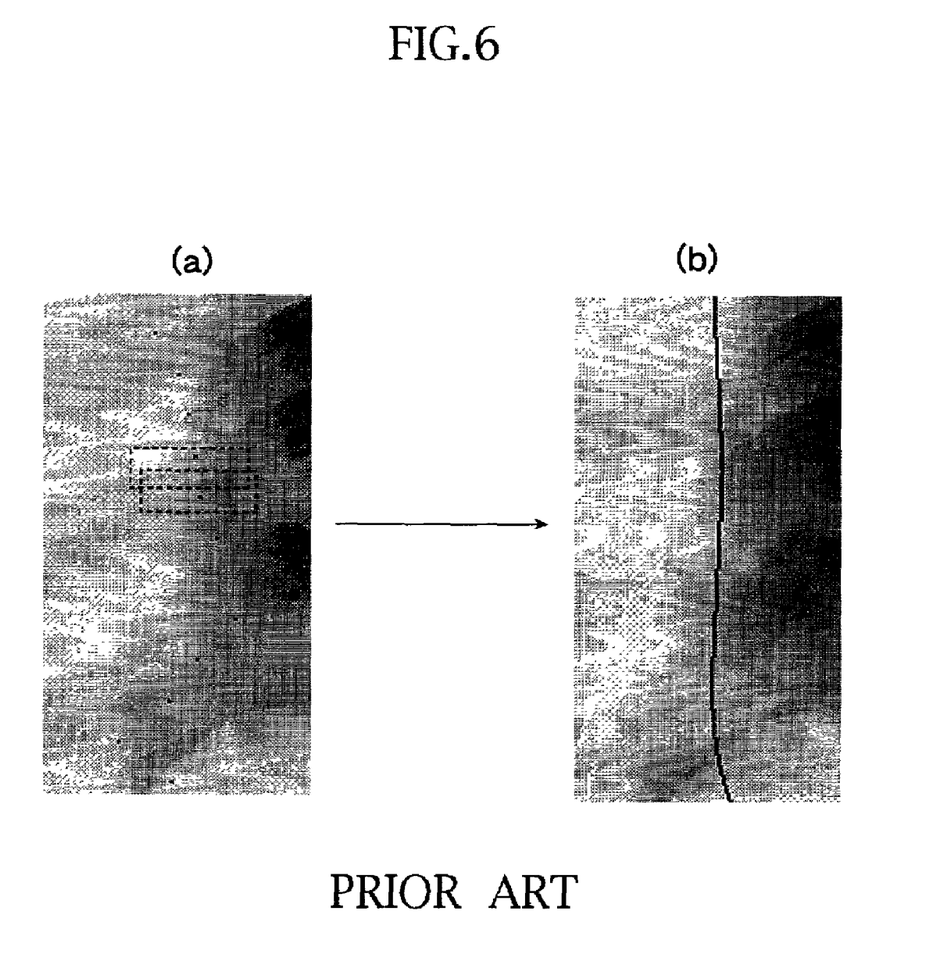
FIG. 6 illustrates a decided result of a series of lower-right ribcage boundary candidate points according to a conventional method.

In the conventional technique, as shown in (a) of FIG. 6 to which this Step S5 is not applied, candidate points for a lower right ribcage boundary are weakly contrasted. Consequently, when a lung structure such as a diaphragm is once detected erroneously, this influences the location of the next searching ROI, and as a result, such misdetection will occur in succession. A boundary to be generated through curve fitting therefore becomes considerably different from its original boundary, as shown in (b) of FIG. 6. However, in the present detection, because processing of Step S5 is placed, such failures in the detection can be avoided so as to provide a correct ribcage boundary.

An integrated average profile of pixel values in the searching ROI, which is obtained at Step S5, is then acquired (Step S6). For a search of a series of upper ribcage boundary candidate points, pixel values of M-pixels (about 2% of the image width) residing in the X-direction of the searching ROI are integrated and averaged, and then this integration and averaging is carried out at each pixel belonging to the size in the Y-direction of the searching ROI, thus providing a pixel-value integrated average profile. For a search of the series of right/left ribcage boundary candidate points, pixel values of V-pixels (about 3% of the image length) residing in the Y-direction of the searching ROI are integrated and averaged, and then this integration and averaging is carried out at each pixel belonging to the size in the X-direction of the searching ROI, thus providing a pixel-value integrated average profile.

Then, profile data are smoothed in order to reduce noise of the pixel-value integrated average profiles which are acquired at Step S6 (Step S7).

Furthermore, a first and second derivative of each of the smoothed pixel-value integrated average profiles which are obtained at Step S7 are calculated for an analysis of each profile (Step S8).

Boundary candidate points are calculated from the first and second derivatives which are obtained at Step S8 (Step S9). At Step S9, locations are found where the first derivative equals zero, the first derivative is a maximum, and the second derivative equals a minimum, whereby the candidate boundary points are obtained.

Repeating the aforementioned Steps S1 to S9 a plurality of times leads to the acquisition of the desired series of boundary candidate points.

Although contrast within the searching ROI may be raised by various techniques, such as histogram equalization, histogram transformation, gamma correction, and gray scale processing, it is most desirable, from the viewpoint of cost, to adopt the histogram flattening technique, which does not require the calculation of particular coefficients.

Figure 7:
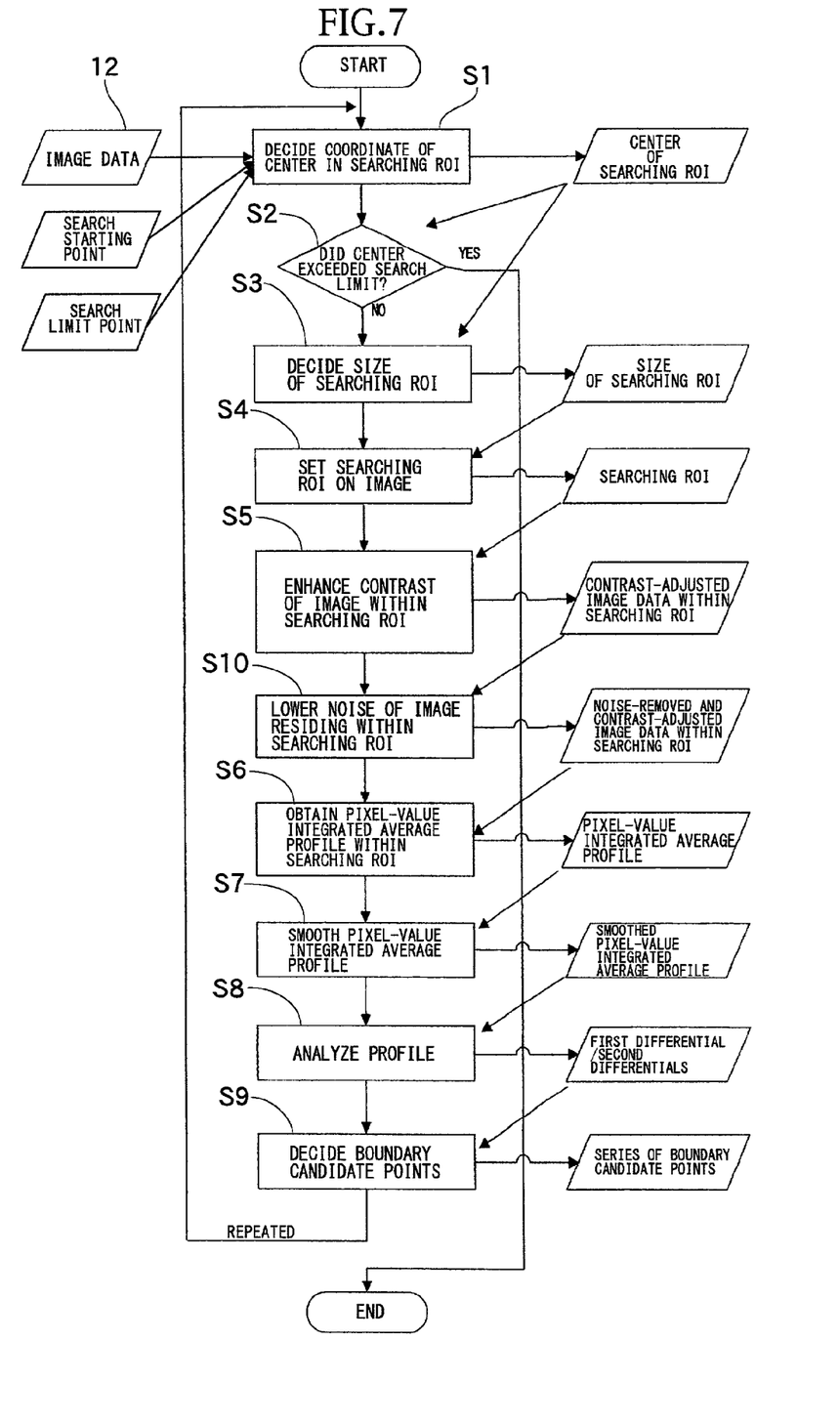
FIG. 7 is a flowchart made by adding, into the flowchart of FIG. 5, a step for lowering the noise of an image in each searching ROI.

There is provided one modification for the above detection. FIG. 7 is a flowchart showing the modification, in which a step for a noise reduction from an image residing in the searching ROI is added to the flowchart shown in FIG. 5 which explains both the decision of the upper ribcage candidate boundary point series and the right/left ribcage boundary candidate point series.

There is a possibility that the contrast-enhanced image in the searching ROI which is acquired at Step S5 includes a slight amount of noise, such as the clavicle, the rib, and shade, in contrast to ribcage information. To improve this, a procedure to remove such noise by smoothing the image within the searching ROI is added next to Step S5 (Step S10).

The adoption of Step S10 subsequent to Step S5, as shown in FIG. 7, allows noise existing inside the lung field to be removed, thereby largely reducing a misdetection rate of such objects as the clavicle, the rib, shade, or others from the lung field. This noise removal is performed so effectively that Step S1 may be adopted independently, without adopting Step S5.

A practical technique which is carried out at Step S10 is using a moving average filter with a matrix size of "m×n," which removes noise of the image within the searching ROI. The matrix size. "m×n" is connected to a size of "M×N" of the searching ROI through the relationships of M>m and N>n. Therefore, the larger m and n are in value, the greater the noise reduction effect, while the smaller m and n are in value, the less the noise reduction effect. The values of m and n can be selected suitably depending on a searched region. In the detection method according to the present invention, both values are set such that m=3 and n=3, regardless of the locations of the searched regions. Other smoothing filters may also be used selectively in the same condition.

Figure 8:
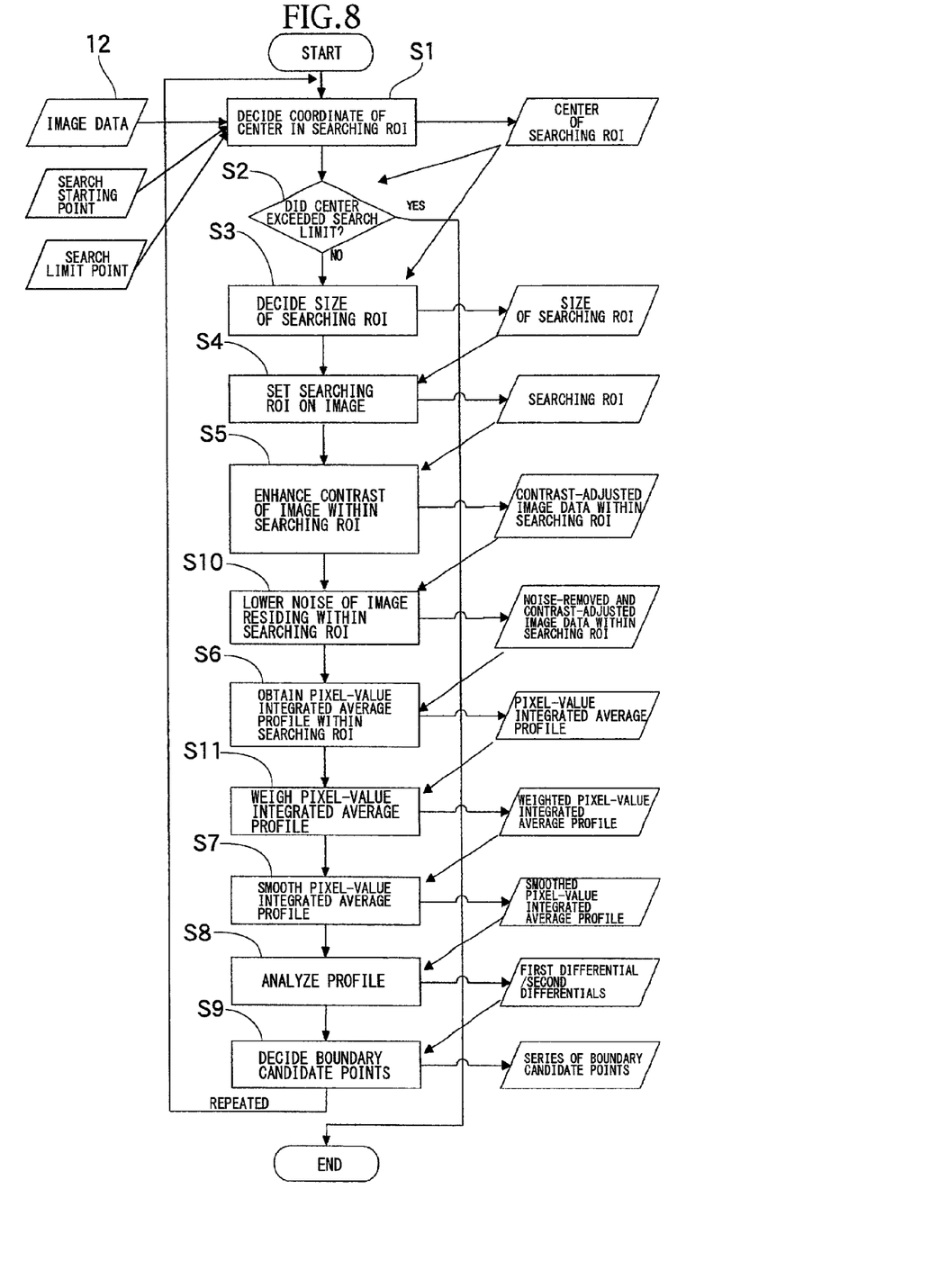
FIG. 8 is a flowchart made by adding, into the flowchart of FIG. 7, a step for weighting a density integrated average profile.

Additionally, there is another modification for the foregoing detection. FIG. 8 is a flowchart showing the modification, in which a step for weighting the pixel-value integrated average profile is added to the flowchart shown in FIG. 7 which explains both the decision of the upper ribcage candidate boundary point series and the right/left ribcage boundary candidate point series.

The weighting processing is performed, inside the searching ROI, on the pixel-value integrated average profile by using weights which are made smaller than those used outside the searching ROI (Step S11). Such smaller weights are obtained based on lung-view characteristics of the chest (shapes, contrast of pixel data, etc.). This causes large noise objects, such as the clavicle, the rib, and shads, excluding the ribcage, to be removed from the profile which is obtained at Step S6.

Figure 9:
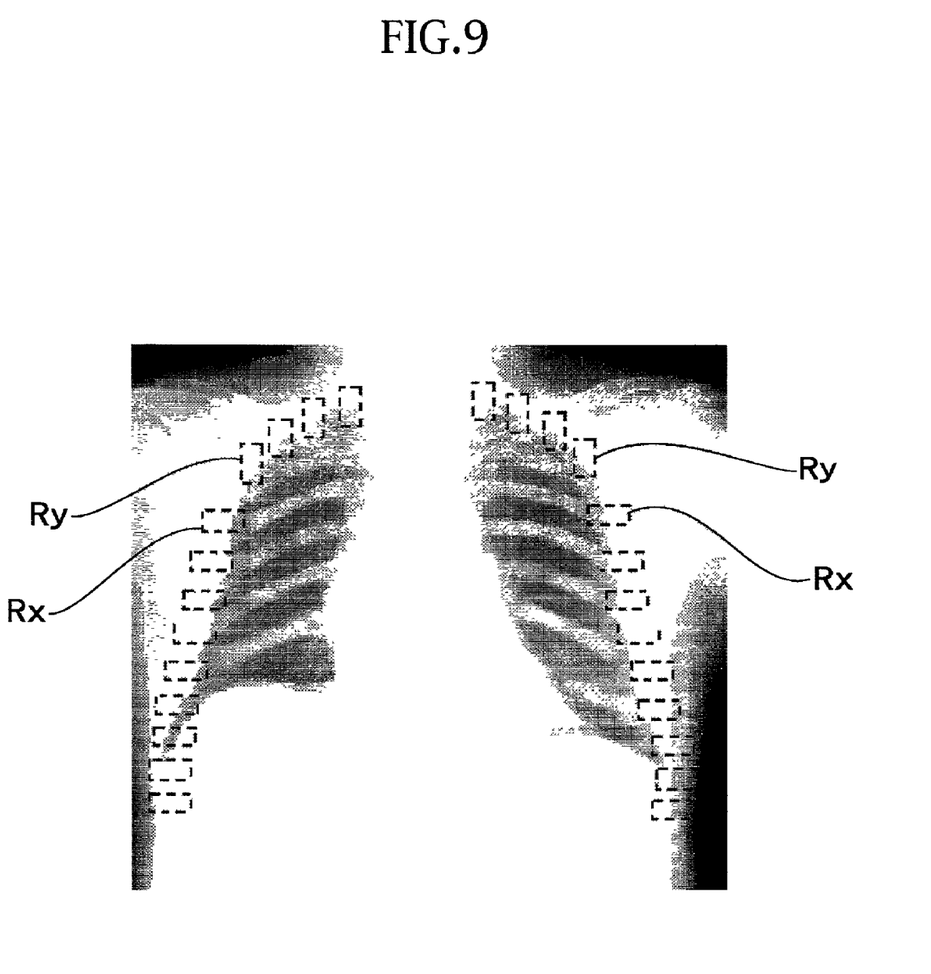
FIG. 9 is an illustration for exemplifying the mapping of searching ROIs in detecting a series of ribcage boundary candidate points.

A more practical technique which is carried out at Step S11 is shown in FIG. 9. As shown therein, a premise is made such that, for detecting the upper ribcage boundary candidate point series, there is noise (the clavicle, rib, diaphragm, and others) inside a horizontal pixel-value integrated average vertical profile which is obtained with a vertically rectangular searching ROI Ry, whereas for detecting the right/left ribcage boundary candidate point series, there is such noise inside a vertical pixel-value integrated average horizontal profile which is obtained with a laterally rectangular searching ROI Rx. Based on these premises, the weighting of the integrated average pixel values is performed according to the following equation.

$PDst(i)=PSrc(i) \times Weight$, where

Weight=1.0 for ($0 \leq i \leq n-1$); or
Weight=$1-j/(N-n)$ for ($n \leq i \leq N-1$),
n:n<N, i: $0 \leq i \leq N-1$, j: $1 \leq j \leq N-n$, and N: width of profile,
PDst(i): profile value which is obtained after i-th weighting from the outside, and
PSrc(i): profile value which is obtained before i-th weighting from the outside.

Figure 10A:
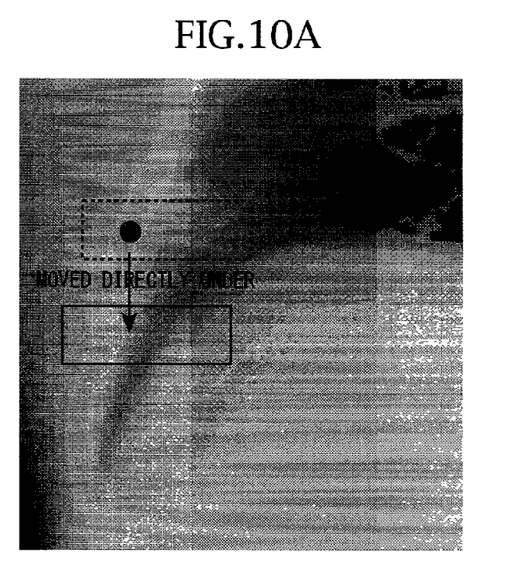
FIG. 10A illustrates the relationship between a mapped position of a searching ROI in the vicinity of lower right ribcages and weighting a profile within the searching ROI.
Figure 10B:
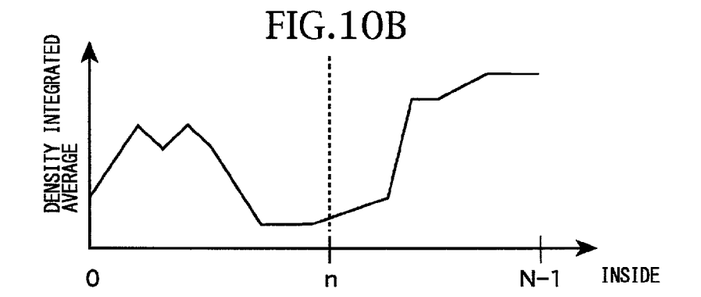
FIG. 10B graphically shows a before-weighted profile.
Figure 10C:
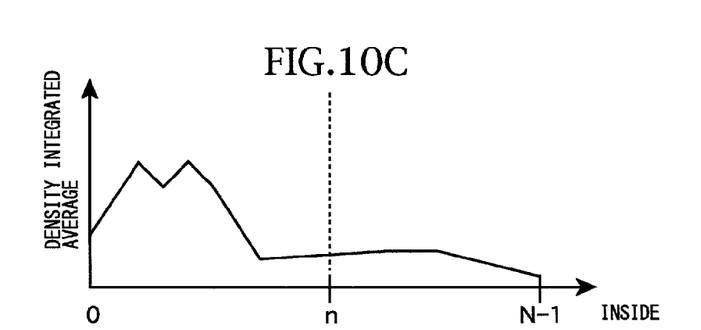
FIG. 10C graphically shows an after-weighted profile.

As shown in the above equation, the weights gradually reduce as the weighting goes from a center of each of the vertical profile horizontal profile toward the inside of the ROI. As a result, in the right/left ribcage boundary search, the center of the next searching ROI is moved directly from under both the center of the last searching ROI around the right lower ribcage which was detected the last time and the detected candidate points, as an image of processing object, as shown in FIG. 10A. When performing weighting on the image-value integrated average profile, the profile before weighting shown in FIG. 10B changes in shape into the profile after weighting shown in FIG. 10C.

Although the above detection method adopts n=N/2, values of n and N can be selected appropriately depending on a size of the searching ROI and/or anatomical positions of the boundary candidate points to be detected. While this weighting method uses a linear function, a non-linear function may be used in the weighting, as long as its weights reduce as the weighting goes toward the inside of the lung field.

Figure 11A:
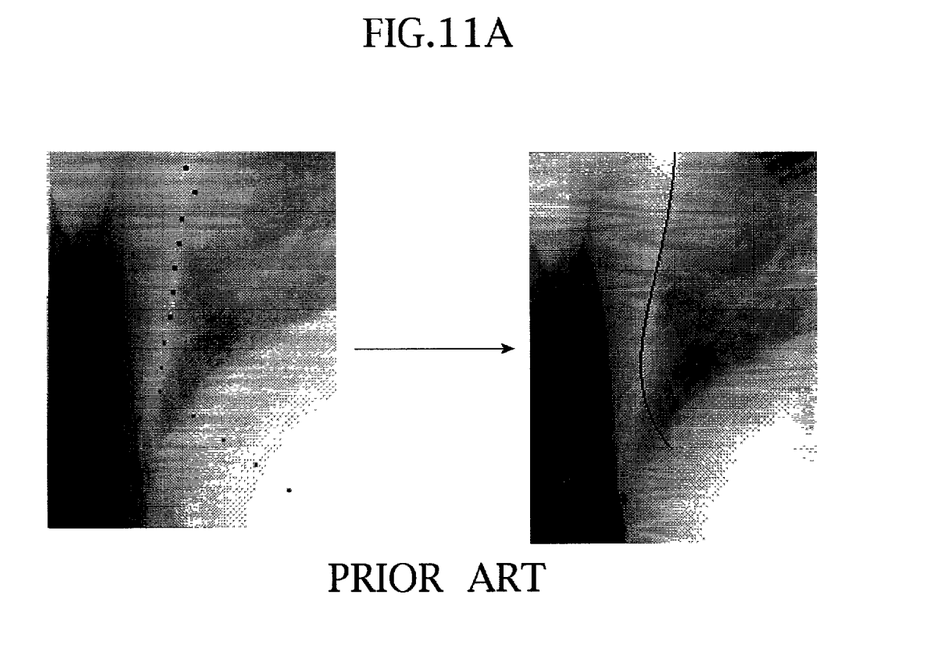
FIG. 11A pictorially shows a misdetected example according to the conventional technique, which is a result that is detected from a ribcage boundary that exists in the lower lung sinister.
Figure 11B:
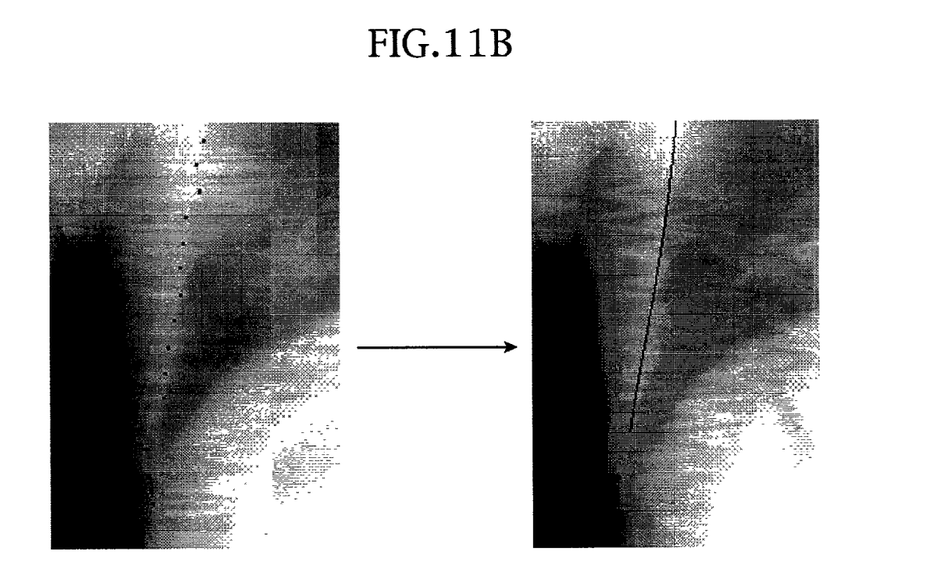
FIG. 11B pictorially shows a successfully detected example according to the present invention technique, which is a result that is detected from a ribcage boundary that exists in the lower lung sinister.

FIG. 11A shows an example of misdetection occurring in the right lung lower-field ribcage boundary. In the conventional technique, if a searching ROI is placed on the diaphragm, a diaphragm boundary with higher contrast than the ribcage boundary is misdetected. This causes misdetection to thereafter occur one after another, and therefore, an incorrect ribcage is provided. In contrast, the detection according to the invention is executed by weighting the pixel-value integrated average profile produced from an image existing within a searching ROI, which makes it possible to remove the diaphragm which is inconvenient for the detection of the ribcage boundary. Accordingly, as shown in FIG. 11B, candidate points for the true ribcage boundary can be obtained with precision.

Figure 12:
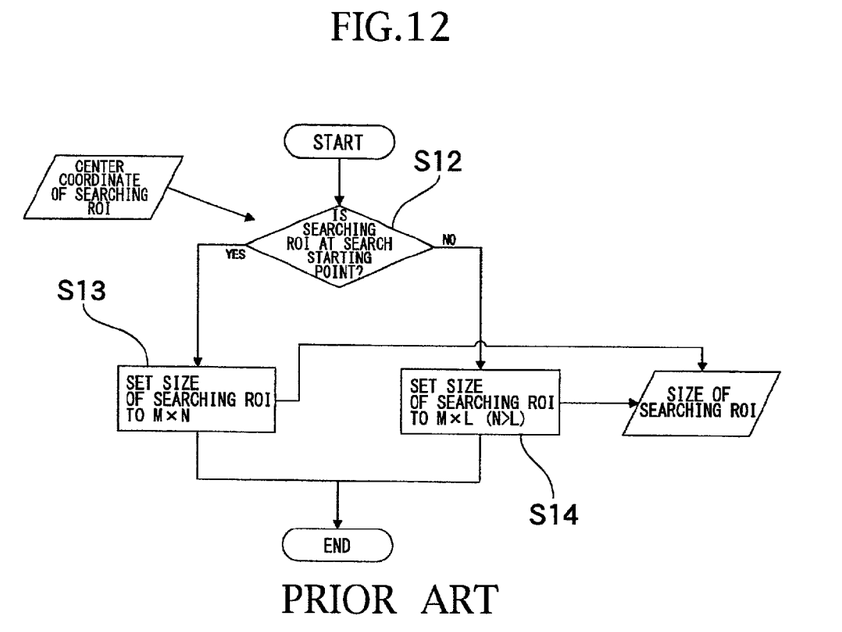
FIG. 12 details a flowchart based on the conventional technique in deciding a size of each searching ROI, which is part of a decision of a series of boundary candidate points in deciding a series of upper ribcage candidate points.

FIG. 12 is a detailed flowchart showing a conventional technique for detecting the size of each searching ROI, which corresponds to Step S3 of FIG. 5, for example, assigned for the detection of the boundary candidate point series which is carried out in the processing of deciding the upper lung ribcage candidate point series.

In the conventional region-size deciding technique, it is determined whether or not a searching ROI is arranged at a search starting point (Step S12). When it is determined that the region is located at the search starting point, the processing is made to proceed to Step S13 that gives "M×N" to the region size. If it is determined that the region is not located at the search starting point, the processing is made to proceed to Step S14 that gives "M×L (N>L)" to the region size. That is, in this conventional technique, the size of the searching ROI is set to "M×N" at the search starting point and to "M×L" at points other than the search starting point.

In contrast, in the searching method of the present invention, the size of a searching ROI is fixed at "M×N" over the entire search, regardless of whether or not the searching ROI is located at the search starting point.

Figure 13:
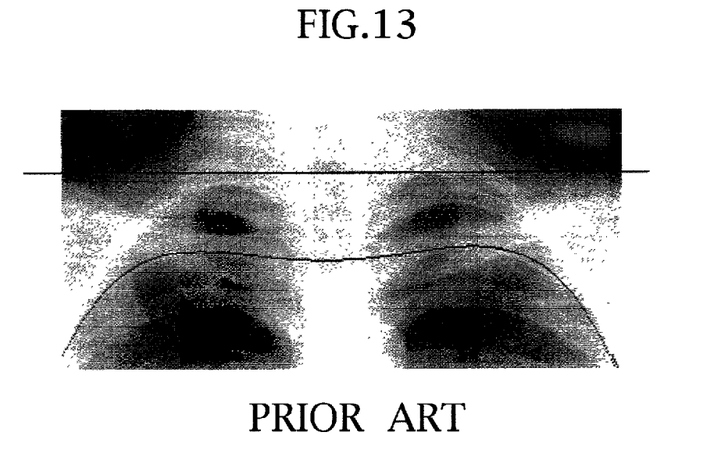
FIG. 13 pictorially shows a misdetected ribcage boundary in a top lung end portion according to the conventional technique.

In cases where the conventional technique is used in which the size of the searching ROI is M×N at the search starting point and M×L at other locations, positions where a clavicle and a rib overlap each other are misdetected as the lung upper end, as shown in FIG. 13. This is because contrast inside the lung field is high due to an apparent difference in pixel value between the lungs and the clavicles, ribs, and others in the top lung field. However, as in the case of the detection of the present invention, the size of a searching ROI is fixed at M×N through the whole search, and therefore, the searching ROI can be located at positions where it has not been located so far. This makes it easier to find upper lung ribcage boundary candidate points. Even when the detection is performed unsuccessfully, the acquisition of one or more candidate points on the true upper lung ribcage boundary permits the upper ribcage boundary to be fitted to its true shape by using a fourth-order fitting curve. In this detection, the upper lung ribcage boundary candidate point series are detected on the condition that M=11 and N=47.

While the foregoing has described the decision of the upper lung ribcage boundary candidate point series, the same concept can, of course, be applied to the decision of the right/left ribcage boundary candidate point series. In the latter case, the relationship between M and N should be replaced with U and V.

Figure 14A:
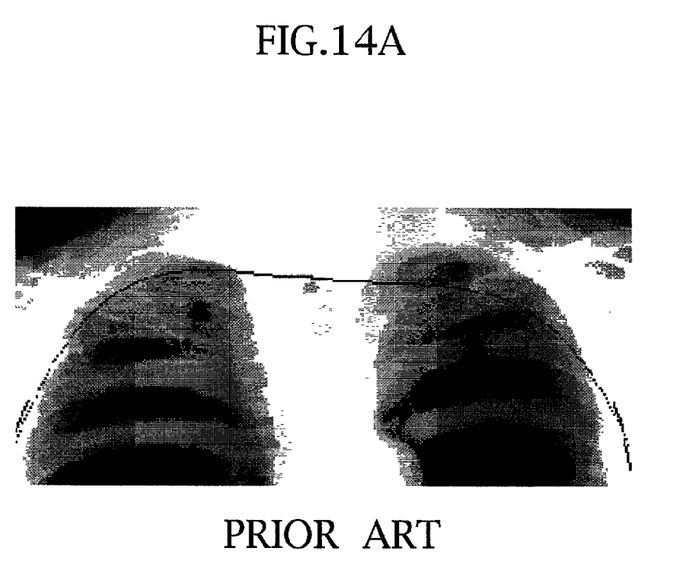
FIG. 14A pictorially exemplifies a misdetected upper ribcage boundary according to the conventional technique.
Figure 14B:
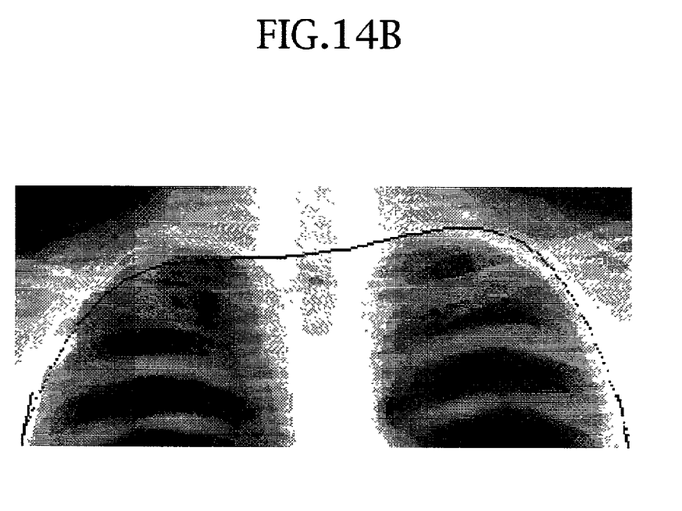
FIG. 14B pictorially exemplifies a successfully detected upper ribcage boundary according to the present invention.

The conventional technique led to a misdetection of the upper left ribcage boundary candidate points at incorrect positions (on the clavicle), as shown in FIG. 14A. This results from the fact that the candidate points are pulled toward the ribs or clavicles, because the top of the lung of the left lung field is high in contrast. In contrast, in the detection of the present invention, since the size of the searching ROI is fixed at M×N over the entire search, the size of a searching ROI can be located on the upper left ribcage boundary. Thus, as shown in FIG. 14B, at least one candidate point can be located on the true upper left ribcage boundary, and can undergo curve fitting. A boundary similar to the true upper left ribcage boundary was acquired.

Additionally, the system and method for detecting the ribcage boundary from a digital chest image according to the embodiment of the present invention can be used for computer-aided diagnosis requiring lesion-enhanced images where the temporal changes of lung diseases or the like are detected from plural digital chest images which are acquired from the same patient's region at different times, similar to the conventional technique. This system and method are also available for a single image. For example, it is possible to detect anatomical structure information from a single frame of a chest image to utilize it for computer-aided diagnosis.

Using actual images of 194 pieces (97 sets), the inventors made an experiment to know a rate of success in detecting ribcage boundary information (that is, the probability that no misdetection is caused in an image). In the case of the conventional technique, as shown in Table 1, the rate of success was 27.6%. In contrast, in the technique to which the present invention is applied, where the image data existing within a searching ROI is enhanced in contrast, noise-reduced, and weighted to their pixel-value integrated average profile, the size of each searching ROI being fixed at "M×N" for all the search, the rate of success was improved up to 94.8%, as shown in Table 2. Especially, the perfect rate of success, 100%, was obtained for the right/left lower ribcage boundaries.

TABLE 1

(Conventional technique)

| No. | SUCCESS/FAILURE IN DETECTION | | NUMBER OF EVENTS (PERCENTAGE) | |
|---|---|---|---|---|
| 1 | | success | 53(=27.6%) | |
| 2 | | failure | 141(=72.4%) | |
| 3 | classi-fication | failure in lower right ribcage | 60(=30.9%) | 99(=51.0%) |
| 4 | | failure in lower left ribcage | 39(=20.1%) | |
| 5 | | failure in upper right ribcage | 61(=31.4%) | 119(=61.3%) |
| 6 | | failure in upper left ribcage | 58(=29.9%) | |
| 7 | | failure in upper-most end of lung | 6(=3.1%) | |
| 8 | | inaccuracy in right connecting part | 3(=1.54%) | 8(=4.12%) |
| 9 | | inaccuracy in left connecting part | 5(=2.57%) | |
| 10 | | failure in lower-most end of lung | 1(=0.51%) | 1(=0.51%) |

TABLE 2

(The technique of the present invention)

| No. | SUCCESS/FAILURE IN DETECTION | | NUMBER OF EVENTS (PERCENTAGE) | |
|---|---|---|---|---|
| 1 | | success | 184(=94.8%) | |
| 2 | | failure | 10(=5.02%) | |
| 3 | classi-fication | failure in lower right ribcage | 0(=0.00%) | 0(=0.00%) |
| 4 | | failure in lower left ribcage | 0(=0.00%) | |
| 5 | | failure in upper right ribcage | 7(=3.60%) | 13(=6.70%) |
| 6 | | failure in upper left ribcage | 6(=3.10%) | |
| 7 | | failure in upper-most end of lung | 6(=3.1%) | |
| 8 | | inaccuracy in right connecting part | 1(=0.67%) | 2(=1.03%) |
| 9 | | inaccuracy in left connecting part | 1(=0.67%) | |

Although the description above contains many specificities, these should not be construed as limiting the scope of the present invention but as merely providing illustrations of some of the presently preferred embodiments of the present invention. Thus, the scope of the present invention should be determined by the appended claims and their equivalents.

The invention claimed is:

1. A method for detecting, from a digital chest image, a ribcage boundary for computer-aided diagnosis with which landmark information serving as a landmark in displaying a chest configuration depicted on the digital chest image is detected and a ribcage boundary is detected from the landmark information, said method comprising:

deciding a size of a searching ROI mapped on the digital chest image;
setting the searching ROI on the digital chest image;
enhancing an image within the searching ROI set on the digital chest image;
obtaining a profile of pixel values existing within the searching ROI;
weighting the profile of pixel values existing within the searching ROI;
analyzing the obtained profile so as to decide a candidate point for the ribcage boundary; and
repeating said deciding, said setting, said enhancing, said obtaining, said weighting and said analyzing until a center of each of a plurality of searching ROIs, which are different in position for each repetition, advances immediately before a given search limit so as to provide a series of candidate points for the ribcage boundary; and
wherein the profile consists of a horizontal pixel-value averaged vertical profile and a vertical pixel-value averaged horizontal profile, and a weight of the weighting becomes increasingly smaller as the weighting advances from a center of each of the vertical and horizontal profiles toward an inside of lung fields.

2. The method of claim 1, further comprising lowering noise of the image residing in the searching ROI between said enhancing and said obtaining.

3. The method of claim 2, wherein the searching ROI is set to have a length which is larger than widths of the ribs and clavicles in the digital chest image, wherein said method further comprises searching the points by using the searching ROI, and wherein a size of the searching ROI is fixed from a search starting point to a search end point.

4. The method of claim 3, further comprising smoothing the image residing within the searching ROI by using a moving average filter composed of a region in an area which is smaller than the searching ROI.

5. The method of claim 2, further comprising smoothing the image residing within the searching ROI by using a moving average filter composed of a region in an area which is smaller than the searching ROI.

6. The method of claim 1, wherein the size of each of the plurality of searching ROIs mapped on the digital chest image through said repeating are fixed and independent on locations of the searching ROIs.

7. A system for detecting, from a digital chest image, a ribcage boundary for computer-aided diagnosis with which landmark information serving as a landmark in displaying a chest configuration depicted on the digital chest image is detected and a ribcage boundary is detected from the landmark information, said system comprising:

a landmark detector for detecting the landmark information serving as the landmark in displaying the chest configuration depicted on the digital chest image;

a candidate point series detector for detecting both of an upper ribcage boundary point series and a right/left ribcage boundary candidate point series from image data of the digital chest image and the landmark information detected by said landmark detector by implementing the operations of claim 1;

a boundary point series combining unit for combining the upper ribcage boundary point series with the right/left ribcage boundary candidate point series so as to produce ribcage boundary information which is indicative of a contour of ribs of the chest; and an image displaying processor for displaying ribcage information made up of the landmark information and the ribcage boundary information on the image.

8. The system of claim 7, further comprising means for weighting a pixel-value profile of an image residing within the searching ROI to be mapped on the digital chest image.

9. The system of claim 7, further comprising means for smoothing the image residing within the searching ROI by using a moving average filter composed of a region in an area which is smaller than the searching ROI.

10. The system of claim 7, wherein the searching ROI is set to have a length which is larger than widths of the ribs and clavicles in the digital chest image, wherein said system further comprising means for searching the points by using the searching ROI, and wherein a size of the searching ROI is fixed from a search starting point to a search end point.

11. The system of claim 10, further comprising means for smoothing the image residing within the searching ROI by using a moving average filter composed of a region in an area which is smaller than the searching ROI.

12. The method of claim 1, wherein the searching ROI is set to have a length which is larger than widths of the ribs and clavicles in the digital chest image, wherein said method further comprises searching the points by using the searching ROI, and wherein a size of the searching ROI is fixed from a search starting point to a search end point.

13. The method of claim 12, further comprising smoothing the image residing within the searching ROI by using a moving average filter composed of a region in an area which is smaller than the searching ROI.

14. The method of claim 1, further comprising smoothing the image residing within the searching ROI by using a moving average filter composed of a region in an area which is smaller than the searching ROI.

* * * * *